United States Patent Office 3,461,142
Patented Aug. 12, 1969

3,461,142
3-DESOXY-PREGNENES
Fred A. Kincl, Mexico City, Mexico, assignor, by mesne assignments, to Syntex Corporation, a corporation of Panama
No Drawing. Filed Oct. 26, 1960, Ser. No. 65,022
Int. Cl. C07c *169/34, 169/36, 169/30*
U.S. Cl. 260—397.4                                15 Claims The present invention relates to novel cyclopentanophenanthrene compounds and to a novel process for the production thereof.

More particularly the present invention relates to novel 3-desoxy progestational derivatives and more specifically to novel 3-desoxy-17α-acyloxy-$\Delta^4$-pregnene - 3,20 - diones and 3 - desoxy-17α-acyloxy-$\Delta^{4,6}$-pregnadiene-3,20-diones which may also contain a methyl or halogen substituent at C–6.

The novel compounds of the present invention which exhibit progestational, anti-ovulatory and anti-estrogenic activity with minimal or no androgenic effect are represented by the following formulas:

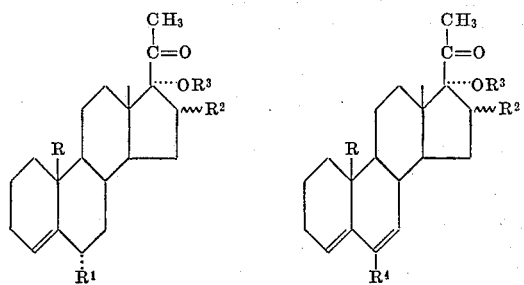

In the above formulas, R represents hydrogen or methyl; R' represents hydrogen, methyl or fluorine; $R^4$ represents hydrogen, chlorine, methyl or fluorine; $R^2$ represents hydrogen, α-methyl or β-methyl and when $R^2$ is methyl, R is methyl; $R^3$ represents hydrogen or the acyl group of a hydrocarbon carboxylic acid of less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention may be prepared in part by a process illustrated by the following equations:

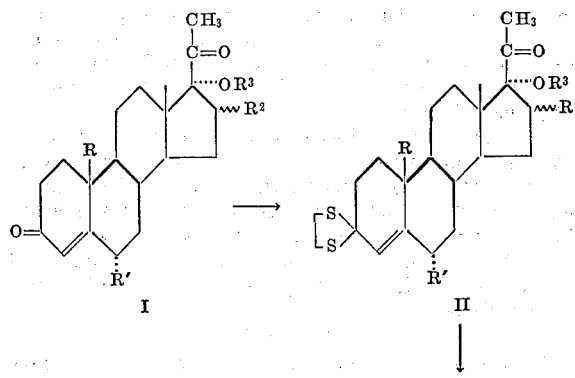

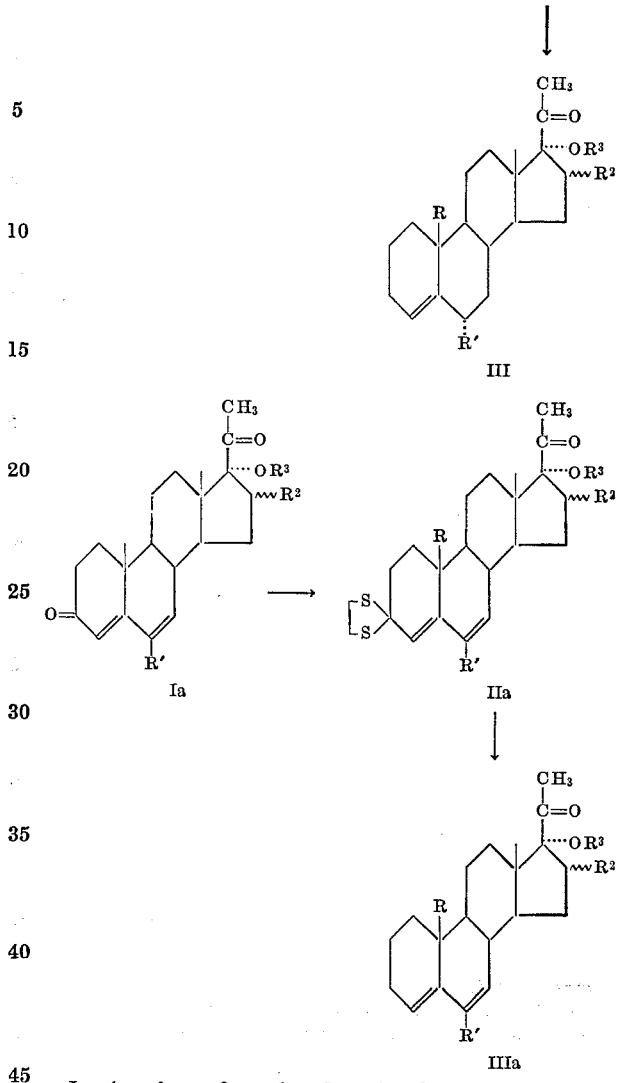

In the above formulas, R, R', $R^2$ and $R^3$ have the same meaning as previously described.

In practicing the process outlined above, a 17α-acyloxy progesterone, preferably the acetate or caproate (I), or the 6-dehydro derivative thereof (Ia) is refluxed with ethane-1,2-dithiol and boron trifluoride etherate complex for a period of time of the order of one half hour to form the 3-monoethylene mercaptal (II or IIa). The latter derivative is then selectively hydrogenolyzed as by refluxing with Raney nickel in a solvent such as acetone or methanol to effect removal of the dithioketal moiety to form the 3-desoxy derivative (III or IIIa).

The above described reaction sequence may also be employed using the free 17α-hydroxy pregnan derivatives; in cases where there are formed the corresponding 3,20-dimercaptals and 3-monomercaptals, these are separated by conventional means, such as for example crystallization, chromatography or counter-current distribution and the 3-monomercaptals are employed for the reaction as above described.

Alternatively, the free 17α-hydroxy compounds may be obtained by saponifying the esters of these compounds by conventional means, as for example by treatment with sodium hydroxide in aqueous methanol.

The 17α-hydroxy 3-desoxy pregnan derivatives are likewise potent progestational and anti-estrogenic agents, or may be converted into the 17-esters by conventional means if so desired.

The preparation of the novel compounds of the present invention having a chloro substituent at C-6, may be illustrated by the following equation:

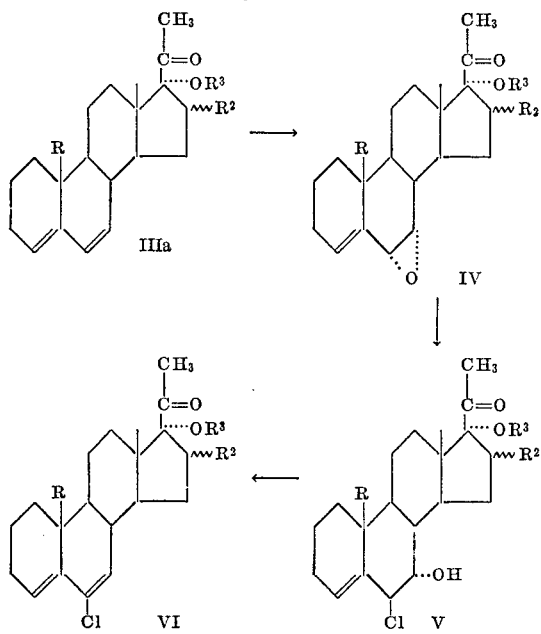

In the above formulas, R, $R^2$, and $R^3$ have the same meaning as previously set forth.

In practicing the process outlined above, a 17α-hydroxy or 17α-acyloxy-$\Delta^{4,6}$-pregnadien-20-one (IIIa) is reacted with one equivalent of a peracid such as permonophthalic acid in chloroform at about 0° C. Upon treatment of the epoxide with 2 molar equivalents of hydrogen chloride in glacial acetic acid, the epoxide ring is opened and there is added the elements of hydrogen and chlorine to form the chlorohydrin (V). By reaction with thionyl chloride in pyridine solution at room temperature, dehydration at C-7 is effected and there is formed the 6-chloro-17α-hydroxy or 6-chloro-17α-acyloxy-$\Delta^{4,6}$-pregnadiene-20-one compound (VI).

The following examples serve to illustrate but are not intended to limit the scope of the present invention:

Example I

A mixture of 1 g. of 17α-acetoxy progesterone, 5 cc. of acetic acid, 0.5 cc. of ethylene dithiol and 0.5 cc. of boron trifluoride-etherate was refluxed for 30 minutes. The reaction mixture was cooled and the thioketal which crystallized was separated, washed with methanol and dried. Crystallization from methylene chloride-methanol gave the pure compound, M.P. 274°–280°.

200 mg. of the above compound and 3.5 g. of Raney nickel were suspended in 20 cc. of acetone and then refluxed for 24 hours. The Raney nickel was removed by filtration and the filtrate was concentrated to dryness. Crystallization of the residue from methylene chloride-methanol afforded 3-desoxy-17α-acetoxy progesterone, M.P. 176–180° C.

Example II

By substituting in the method of Example I the 17α-acetoxy progesterone by the caproate of $\Delta^4$-pregnen-17α-ol-3,20-dione, there was afforded the caproate of 3-desoxy-17α-hydroxy-progesterone.

Example III

By following the method described in Example I, 6α-methyl-17α-acetoxy progesterone was converted into the 3-monodithioketal and finally into 6α-methyl-$\Delta^4$-pregnen-17α-ol-20-one acetate.

Example IV

By applying the method of Example I to 19-nor-17α-acetoxy progesterone there was finally afforded 19-nor-$\Delta^4$-pregnen-17α-ol 20-one acetate.

Example V

By substituting in the method of Example I the 17α-acetoxy progesterone by 6α-fluoro-17α-propionoxy-progesterone, there was obtained 6α-fluoro-17α-propionoxy-$\Delta^4$-pregnen-20-one.

Example VI

By substituting in the method of Example I the 17α-acetoxy progesterone by 6-methyl-$\Delta^{4,6}$-pregnadien-17α-ol-3,20-dione acetate, there was finally obtained 6-methyl-$\Delta^{4,6}$-pregnadien-17α-ol-20-one acetate.

Example VII

The method described in Example I was applied to 17α-propionoxy-$\Delta^{4,6}$-pregnadiene-3,20-dione and to the corresponding 19-nor derivative thereof and there was obtained 17α-propionoxy-$\Delta^{4,6}$-pregnadien-20-one and 17α-propionoxy-19-nor-$\Delta^{4,6}$-pregnadien 20-one.

Example VIII

By substituting in Example I the 17α-acetoxy progesterone by 6-fluoro-$\Delta^{4,6}$-pregnadien-17α-ol-3,20-dione acetate, and following the method described in such example, there was afforded 6-fluoro-$\Delta^{4,6}$-pregnadien-17α-ol-20-one acetate.

The 6-fluoro-$\Delta^{4,6}$-pregnadien-17α-ol-3,20-dione acetate was prepared by refluxing 1 part of 6α-fluoro-17α-acetoxy-progesterone with 2 parts of chloranil and 50 parts of tertiary butanol for 8 hours. The mixture was cooled, the excess of chloranil was filtered and washed with ethyl acetate and the organic extracts washed with a 10% cold aqueous sodium hydroxide solution until the washings were colorless. It was then dried over anhydrous sodium sulfate and the ethyl acetate was evaporated. Recrystallization from methylene chloride-ether afforded 6-fluoro-17α-acetoxy-$\Delta^{4,6}$-pregnadiene-3,20-dione.

Example IX

To a solution of 0.01 mol of 17α-acetoxy-$\Delta^{4,6}$-pregnadien-20-one in 100 cc. of methylene chloride, there was added 80 cc. of chloroform solution containing 1 molar equivalent of monoperphthalic acid and the mixture was maintained at 0° C. for 24 hours; it was then washed with a 5% aqueous solution of sodium carbonate and then with water, dried over anhydrous sodium sulfate and concentrated to incipient crystallization. The mixture was cooled, the precipitate was filtered, air dried and purified by crystallization affording the 6α,7α-oxido-17α-acetoxy-$\Delta^4$-pregnen-20-one.

To a suspension of 1 part of the 6α, 7α-oxido compound in 10 parts of glacial acetic acid, there was added 2 molar equivalents of concentrated hydrochloric acid and the mixture was heated on the steam bath for 20 minutes. The resulting dark solution was poured into ice-salt water, the formed precipitate collected, washed well with water to neutral, dried and purified by crystallization, affording 6β-chloro-7α-hydroxy - 17α - acetoxy-$\Delta^4$-pregnen-20-one.

1 cc. of thionyl chloride was added to a solution of 250 mg. of the latter compound in 5 cc. of pyridine. After standing at room temperature for about 30 minutes, water was added and the product was isolated with ether. The combined ether extracts were washed with 2 N hydrochloric acid, water, dried over sodium sulfate and evaporated to afford 6-chloro-17α-acetoxy - $\Delta^{4,6}$ - pregnadien-20-one.

Example X

A mixture of 100 mg. of 3-desoxy-17α-acetoxy progesterone obtained as described in Example I, and 5 cc. of a 5% methanolic potassium hydroxide solution was refluxed for 2 hours, cooled, neutralized with acetic acid and poured into ice-salt water. The solid was collected by filtration and recrystallized from acetonehexane thus producing Δ⁴-pregnen-17α-ol-20-one.

In a similar manner, 6α-methyl-Δ⁴-pregnen-17α-ol-20-one acetate, 19-nor-Δ⁴-pregnen-17α-ol-20-one acetate and 6-fluoro-Δ⁴,⁶-pregnadien-17α-ol-20-one acetate gave the corresponding free compounds.

I Claim:
1. A compound of the following formula:

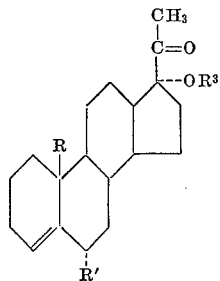

wherein R is hydrogen; R¹ is selected from the group consisting of methyl and fluorine and R³ is selected from the group consisting of hydrogen and a hydrocarbon carboxylic acyl group of less than 12 carbon atoms.

2. A compound of the formula

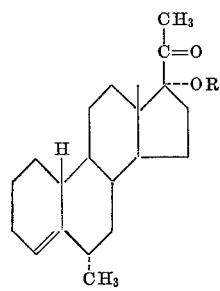

wherein R is selected from the group consisting of hydrogen and a lower hydrocarbon carboxylic acyl group.

3. 6α-methyl-19-nor-Δ⁴-pregnen-17α-ol-20-one.
4. the hydrocarbon carboxylic acid esters of less than 12 carbon atoms of 6α-methyl-19-nor-Δ⁴-pregnen-17α-ol-20-one.
5. 6α-fluoro-Δ⁴-pregnen-17α-ol-20-one.
6. 6α-fluoro-19-nor-Δ⁴-pregnen-17α-ol-20-one.
7. The hydrocarbon carboxylic acid esters of less than 12 carbon atoms of 6α-fluoro-19-nor-Δ⁴-pregnen-17α-ol-20-one.
8. The hydrocarbon carboxylic acid esters of less than 12 carbon atoms of 6α-fluoro-Δ⁴-pregnen-17α-ol-20-one.
9. A compound of the following formula:

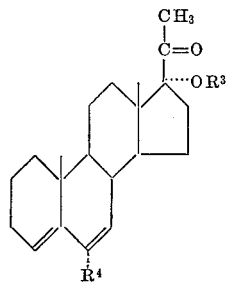

wherein R³ is selected from the group consisting of hydrogen and a hydrocarbon carboxylic acyl group of less than 12 carbon atoms; and R⁴ is selected from the group consisting of hydrogen, methyl, fluorine and chlorine.

10. Δ⁴,⁶-pregnadien-17α-ol-20-one.
11. 6-fluoro-Δ⁴,⁶-pregnadien-17α-ol-20-one.
12. The hydrocarbon carboxylic acid esters of less than 12 carbon atoms of Δ⁴,⁶-pregnadien-17α-ol-20-one.
13. The hydrocarbon carboxylic acid esters of less than 12 carbon atoms of 6-methyl-Δ⁴,⁶-pregnadien-17α-ol-20-one.
14. The hydrocarbon carboxylic acid esters of less than 12 carbon atoms of 6-fluoro-Δ⁴,⁶-pregnadien-17α-ol-20-one.
15. The hydrocarbon carboxylic acid esters of less than 12 carbon atoms of 6-chloro-Δ⁴,⁶-pregnadien-17α-ol-20-one.

References Cited
UNITED STATES PATENTS

| | | | |
|---|---|---|---|
| 2,878,267 | 3/1959 | Szpilfogel et al. | 260—397.3 |
| 2,882,282 | 4/1959 | Agnello et al. | 260—397.3 |
| 3,014,936 | 12/1961 | Mancera et al. | 260—397.45 |
| 3,019,240 | 1/1962 | Bowers et al. | 260—397.3 |
| 3,026,320 | 3/1962 | Djerassi et al. | 260—239.55 |
| 3,031,476 | 4/1962 | Hogg et al. | 260—397.45 |
| 3,037,976 | 6/1962 | Bowers et al. | 260—239.55 |

OTHER REFERENCES
Applezweig: Steroid Drugs II, p. 327.

HENRY A. FRENCH, Primary Examiner

U.S. Cl. X.R.
260—239, 999